United States Patent [19]

Kunimoto et al.

[11] Patent Number: 4,942,007
[45] Date of Patent: Jul. 17, 1990

[54] CONTINUOUS PREPARATION OF SHAPED LONG ARTICLES OF POLYIMIDE

[75] Inventors: Akihiro Kunimoto, Ube; Noboru Umemoto, Kuwana, both of Japan

[73] Assignees: Ube Industries, Ltd., Ube; NTN-Rulon Industries, Co., Ltd., Tokyo, both of Japan

[21] Appl. No.: 145,661

[22] Filed: Jan. 14, 1988

Related U.S. Application Data

[63] Continuation of Ser. No. 888,929, Jul. 23, 1986, abandoned.

[30] Foreign Application Priority Data

Jul. 25, 1985 [JP] Japan .................................. 60-164950.

[51] Int. Cl.⁵ .............................................. B29C 47/54
[52] U.S. Cl. ................................... 264/122; 264/126; 264/127
[58] Field of Search ........................ 264/122, 126, 127

[56] References Cited

U.S. PATENT DOCUMENTS

| | | | |
|---|---|---|---|
| 3,068,513 | 12/1962 | Chaffin | 264/127 |
| 3,179,631 | 4/1965 | Endrey | 51/298 X |
| 3,249,588 | 5/1966 | Gall | 51/298 X |
| 3,413,394 | 11/1968 | Jordan | 264/126 |
| 3,925,323 | 12/1975 | Turnbull | 264/126 X |
| 4,238,538 | 12/1980 | Manwiller | 428/36 |
| 4,266,919 | 5/1981 | Dunnington et al. | 425/102 |
| 4,283,361 | 8/1981 | Longworth | 264/120 |
| 4,302,413 | 11/1981 | Howe et al. | 264/126 |

Primary Examiner—Jan H. Silbaugh
Assistant Examiner—Mary Lynn Fertig
Attorney, Agent, or Firm—Frishauf, Holtz, Goodman & Woodward

[57] ABSTRACT

A method of continuously forming a shaped long article of an aromatic polyimide power including supplying a powdery mixture containing an aromatic polyimide powder having a heat loss ratio of not more than 2 wt. % and a mean particle size in the range of 0.1 to 40 μm, and a small amount of a fluororesin powder to a ram-extrusion apparatus having a mold and performing alternately, at a temperature of not lower than 300° C., filling the mold with the above mixture and ram-extruding the same at a pressure in the range of 100–1,500 kg/cm². An extruded long article of an aromatic polyimide which has a specific gravity of more than 1.380, a radial crushing strength of not less than 800 kg/cm², and a coefficient of linear expansion in the radial direction being less than that in the longitudinal direction.

9 Claims, 1 Drawing Sheet

CONTINUOUS PREPARATION OF SHAPED LONG ARTICLES OF POLYIMIDE

This application is a continuation of application Ser. No. 888,929, filed Jul. 23, 1986.

BACKGROUND OF THE INVENTION

1. Field of the invention

This invention relates to a shaped long article of an aromatic polyimide having excellent heat resistance and mechanical properties and further being able to be cut with no difficulty. This invention further relates to a method for continuously preparing on an industrial scale a shaped long article of aromatic polyimide by ram-extrusion process using a specific aromatic polyimide powder.

2. Description of prior arts

It has been regarded difficult to form thick shaped articles of an aromatic polyimide because the aromatic polyimide is not thermoplastic and not melted by heating.

As a method of forming shaped articles of aromatic polyimide using an aromatic polyimide powder, a method disclosed in, for example, Japanese Patent Publication No. 49(1974)-5737 has been proposed and actually practised. The method is characterized in that an aromatic polyimide powder is compressed at a pressure in the range of 700 to 7,000 kg/cm² and at a temperature in the range of room temperature to 400° C. to form a pressed article, and the the resulting article is converted into a shaped article in which particles of the powder are bonded to each other through fused phase, by heating at a temperature in the range of 300° to 500° C. without pressure.

In the above known method, however, a large-sized and powerful compression press is required to carry out the preparation of the pressed article under extremely high pressure. Further, it is difficult to form a sufficiently long shaped article such as a rod having a length of more than approx. 1 meter on industrial scale. Furthermore, the above method comprises steps of filling and compressing the powder, taking out a preformed article and heating the article. These steps should be performed individually and sequentially to produce one article. Therefore, conticuous forming is substantially impossible and productivity is not satisfactory.

A method for continuous preparation of a long shaped article of a polyimide or polyamide resin is described in U.S. Pat. No. 4,238,538. This method uses an apparatus including a die with compaction, back pressure and relief zone and comprises ram-extruding the resin at a temperature of between about 20° C. and 400° C., but below the second order glass transition temperature of the resin to form a shaped article, followed by heating at a temperature above about 250° C., for a time sufficient to coalesce the resin.

SUMMARY OF THE INVENTION

As a result of study of the present inventors for a new method for forming an extruded long article of an aromatic polyimide powder, they have discovered that ram-extrusion forming method using a composition of a specific polyimide powder and fluororesin powder can make it possible to continuously forming a long shaped article having increased strength. The present inventors have further found that use of a specific means for supplying the ram-extruded article with back pressure makes it possible to produce a long shaped article with a decreased coefficient of linear expansion in the radial direction.

There is provided by the present invention a method of continuously forming a long shaped article of an aromatic polyimide powder comprising steps of:

supplying a powdery mixture containing 100 weight parts of an aromatic polyimide powder having a heat loss ratio of not more than 2 wt.%, the heat loss ratio being measured at 360° C. for 1 hour, and a mean particle size in the range of 0.1 to 40 μm, and 0.2 to 8 weight parts of fluororesin powder having a mean particle size not larger than 40 μm to a ram-extrusion apparatus having a mold; and performing alternately, at a temperature of not lower than 300° C., filling the mold with the above mixture and ram-extruding the same at a pressure in the range of 100–1,500 kg/cm², thereby producing a shaped article.

There is further provided by the present invention an extruded long article of an aromatic polyimide which has a specific gravity of more than 1.380, a radial crushing strength of not less than 800 kg/cm², and a coefficient of linear expansion in the radial direction (i.e., cross direction) being less than that in the longitudinal direction (i.e., extrusion direction).

According to the method of the invention, long shaped articles in the form of bar or tube (thick shaped articles) having various kinds of sections (e.g. circular, oval, square, triangular, hexagonal and torus) can be continuously formed at relatively low pressure without any trouble by means of a relatively small sized ram-extrusion apparatus. Accordingly, the method of the invention is satisfactory in productivity.

Long shaped articles of aromatic polyimide formed by the method of the invention have excellent heat resistance and heat stability such as extremely high heat deformation temperature, satisfactory stability in size due to stable coefficient of thermal expansion in the range of room temperature to 300° C., as well as excellent mechanical properties such as radial crushing and flexing resistance (i.e., flexing strength). Further, the extruded long articles of the invention can be easily cut and can be subjected to fabricating processes. Accordingly, the extruded articles of the invention can be employed in wide applications where high heat resistance is needed.

Furthermore, the above-mentioned long extruded article of an aromatic polyimide having a high specific gravity, a high radial crushing strength, and a coefficient of linear expansion in the radial direction being less than that in the longitudinal direction is very advantageously used as a bearing after being fabricated in the form of a ring.

DETAILED DESCRIPTION OF THE INVENTION

Figure 1:
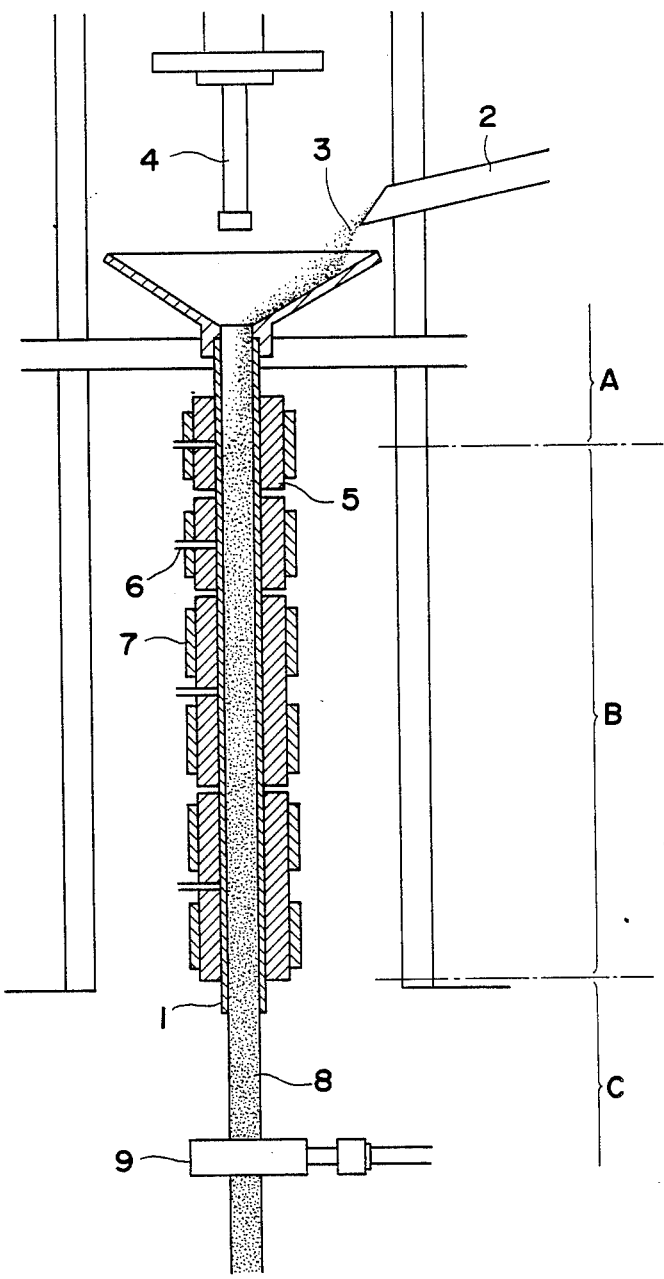
FIG. 1 is a cross-sectional view of main parts of a ram-extrusion apparatus showing one embodiment of the method of the invention.

An aromatic polyimide powder employed in the invention preferably comprises not less than approx. 80 wt.% of heat-resistant aromatic polyimide powder having heat loss ratio of not more than 2 wt.%, preferably not more than 1 wt.% (the value is measured by heating at 360° C. for 1 hour), and a mean particle size in the range of 0.1 to 40 μm, more preferably 1 to 30 μm. and most preferably 2 to 20 μm. Among the particles of the polyimide powder, 80% of the particles preferably have particle sizes in the range of 0.1 to 50 μm.

As the above aromatic polyimide powder, any aromatic polyimide powder can be employed as far as the powder consists essentially of a heat-resistant aromatic polyimide polymer obtained through polymerization and imidation of an aromatic diamine(s) and a tetracarboxylic acid or its derivative such as aromatic tetracarboxylic acid or acid dianhydride thereof. Each of the aromatic diamine and tetracarboxylic acid or its derivative can be employed singly or in combination.

Examples of the above aromatic tetracarboxylic acid and it derivative include aromatic tetracarboxylic acids such as pyromellitic acid, 3,3',4,4'-biphenyltetracarboxylic acid, 2,3,3',4'-biphenyltetracarboxylic acid, 3,3',4,4'-benzophenonetetracarboxylic acid, bis(3,4-dicarboxyphenyl) ether, bis(3,4-dicarboxyphenyl) thioether, bis(3,4-dicarboxyphenyl)methane and 2,2-bis(3,4-dicarboxyphenyl)propane, acid dianhydrides thereof and a mixture of the above-mentioned compounds. In the invention, preferred is a tetracarboxylic acid consisting essentially of biphenyltetracarboxylic acid (contained not less than approx. 50 mol.%, preferably not less than 70 mol.%) from the viewpoints of moldability of the obtained aromatic polyimide powder and physical properties of the resulting article.

Examples of the above aromatic diamine include 4,4'-diaminodiphenyl ether, 4,4'-diaminodiphenyl thioether, 4,4'-diaminodiphenylmethane, 4,4'-diaminobenzophenone, and o-, m- or p-phenylenediamine and mixtures of these diamines. In the present invention, preferred is an aromatic diamine consisting essentially of 4,4'-diaminodiphenyl ether (contained not less than approx. 40 mol.%, preferably not less than 50 mol.% and most preferably not less than 70 mol.%).

There is no specific limitation on the process for preparation of the aromatic polyimide powder. For example, the aromatic polyimide powder can be prepared by polymerizing and imidizing the tetracarboxylic acid component (i.e., acid itself or its derivative) and the aromatic diamine in an approx. equivalent molar amount in an organic polar solvent at a high temperature, thereby precipitating an aromatic polyimide powder.

In another process, the above two components are subjected to polymerization in an organic polar solvent at a relatively low temperature to produce an aromatic polyamic acid. Subsequently, a solvent which does not dissolve the polyamic acid is added to the polymerization liquid so as to precipitate an aromatic polyamic acid powder. The powder is then subjected to imidation by heating (imidation cyclization through dehydration of an acid-amide bond of the polyamic acid), thereby obtaining an aromatic polyimide powder.

In the invention, an aromatic polyimide powder having too large mean particle size would show bad fluidability and insufficient adhesion (partial fusion) between the particles during the ram-extrusion procedure, resulting in deterioration of the molding properties and mechanical strength of the obtained articles. Therefore, the aromatic polyimide powder having too large mean particle size is not suitable in the invention.

Further, in case that a large amount of volatile substance (such as organic polar solvent having high boiling point, low molecular weight organic materials, heat decomposable substance, water, etc.) is contained inside of the aromatic polyimide powder, vaporization of these volatile substances causes unfavorable results in the course of the ram-extrusion such as difficulty in molding and further causes decrease of density through the resulting spongy structures. In these cases, the mechanical properties of the obtained articles such as flexural strength and compression strength extremely lower. Therefore, the aromatic polyimide powder is required to show a heat loss ratio of not more than 2 wt.% when it is heated for 1 hour at a temperature of 360° C. (the "360° C." is a temperature for a typical molding procedure).

In the case that the aromatic polyimide powder contains not a small amount of a volatile component, particularly water, the powder should be subjected to drying or heating treatment in an inert gas atmosphere such as a nitrogen gas and helium gas or in the stream of the gas at a temperature in the range of 50° to 400° C., preferably 100° to 380° C. for a suitable period of time (e.g. 0.2 to 5 hours, preferably 0.5 to 3 hours) by means of a hot-air drying oven so as to remove the volatile component, thereby obtaining suitable heat loss ratio. In this way, the above-mentioned unfavorable influences can be prevented.

Any fluororesin powder may be employed in the invention so long as the powder has a mean particle size of not larger than 40 μm, preferably approx. 30 μm. Preferably, particles of 80 wt.% of the fluororesin powder have particle sizes in the range of 0.1 to 50 μm. It is preferred that the mean particle size of the fluororesin powder is 0.1 to 1.5 times as large as that of the aromatic polyimide powder employed to accomplish uniform blending of the fluororesin powder and the aromatic polyimide powder, uniform dispersion of the powder during the ram-extrusion procedure and decrease of frictional resistance between the inner wall of the mold of the ram-extrusion apparatus and the shaped articles.

In the invention, the fluororesin powder having the above-mentioned mean particle size and comprising a fluororesin of an ethylene tetrafluoride-type in which a repeating unit derived from ethylene tetrafluoride is contained in a polymer main chain in a ratio of at least 60 mol.%, preferably not less than 80 mol.%. The fluororesin of this type serves effectively to decrease the frictional resistance between the inner wall of the mold of the ram-extrusion apparatus and articles which are being shaped during the ram-extrusion procedure, thereby appropriately adjusting the molding pressure. Therefore, the above fluororesin powder is suitable in the invention.

It is desired that the fluororesin of ethylene tetrafluoride type is melt-fabricable, having a crystalline melting point of not lower than 250° C. and a specific melting viscosity of $1 \times 10^3 - 10^6$ poises at $372 \pm 1°$ C. Examples of such resins include a copolymer of ethylene tetrafluoride and propylene hexafluoride and a copolymer of ethylene tetrafluoride and perfluoroalkylvinyl ether. Particularly, an ethylene tetrafluoride resin having a crystalline melting point of not lower than 300° C. and a specific melting viscosity of not lower than $1 \times 10^9$ poids at $372 \pm 1°$ C. is most suitable to minimize the frictional characteristics between the inner wall of the mold and the shaped articles.

In the method of molding of the invention, the powdery mixture comprising 100 weight parts of the aromatic polyimide powder and 0.2 to 8 weight parts of the fluororesin powder, total amount of the both powders being not less than 80 wt.% of the mixture, preferably not less than 90 wt.% and more preferably 95 wt.%, is introduced into a ram-extrusion apparatus.

It is most suitable that the powdery mixture employed in the invention comprises 100 weight parts of the aromatic polyimide powder and 0.3 to 6.5 weight parts of the fluororesin powder, the total amount of the both powders in the mixture being from 90 to 100 wt.%.

In case that the content of the fluororesin powder in the powdery mixture is too small, it becomes difficult or even impossible to mold the powdery mixture by the ram-extrusion method because of increase of frictional resistance of articles against the inner wall of the mold of the ram-extrusion apparatus. On the other hand, in case that the content of the fluororesin powder is too large, the shaped articles obtained from such powdery mixture becomes inferior in mechanical properties such as compressive creep.

In the invention, the powdery mixture comprising the aromatic polyimide powder and the fluororesin powder may further contain a small amount of suitable organic or inorganic additives and fillers having mean particle sizes similar to those of the above powders so as not to give unfavorable influence on the ram-extrusion molding.

The method of the invention can be carried out as follows. At first, the powdery mixture containing the aromatic polyimide powder and the fluororesin powder is supplied to a ram-extrusion apparatus. Then, the powdery mixture is filled in a mold and pressed (compressed) into the mold at a pressure of 100–1,500 kg/cm$^2$, preferably 150–1,000 kg/cm$^2$, and more preferably 150–700 kg/cm$^2$. The filling and compressing procedures are carried out alternately at a temperature not lower than 300° C. and preferably in the range of 320° to 500° C. Subsequently, the powdery mixture is extruded under heating in the form of a long shaped article, thereby continuously producing a long shaped article of polyimide powder.

The above-mentioned ram-extrusion apparatus is not a type of that provided with a rotary screw which is usually provided to a screw-extrusion apparatus. The apparatus is so designed as to compress a powdery mixture into a long mold by means of reciprocating movement of a ram, namely, an extruding bar, and to sinter the mixture, thereby continuously forming a shaped article.

As shown in FIG. 1, for example, the apparatus is required to be provided with (a) cylindrical (i.e., tube-shaped) mold 1 having filling zone A, heat-sintering zone B and cooling zone C arranged in this order; (b) ram 4 provided over the mold 1 and capable of reciprocating toward the inner part (opening) of the filling zone A of the mold 1; and (c) pressure regulator 9 for regulating pressure in the mold by imparting back pressure to the shaped article 8 extruded from the cooling zone C of the mold 1 utilizing frictional force between the surface of the extruded article and the inner wall of the pressure regulator. This back pressure-supplying means is preferably provided outside of the mold and maintained at a temperature of not higher than 250° C. Any apparatus having the above structure may be employed in the invention. Also employable are ram-extrusion apparatus disclosed in U.S. Pat. Nos. 4,238,538 and 4,266,919.

It is preferred that the mold 1 is provided with a heat sintering portion B covered with a plurality of aluminum blocks 5 and being maintained at a suitable temperature (not lower than 300° C., preferably not lower than 320° C.) adjusted by a combination of controlling temperature indicator 6 and band heater 7. If necessary, a heat insulating layer may be provided around the band heater 7 to prevent escape of heat.

The method of the invention for forming shaped articles of the powdery mixture by means of the above ram-extrusion apparatus is carried out, for example, as follows. The powdery mixture 3 is supplied to the filling zone A of the mold 1 of the ram-extrusion apparatus from a hopper (feeder) 2 to fill the mold with the powdery mixture 3. The filled mixture is then compressed by ram 4 toward the heat sintering zone B of the mold 1. The above procedures of filling and compressing the mixture are performed alternately to move the powdery mixture to the lower portion of the heat sintering zone B of the mold 1. At the same time, the powdery mixture is compressed, heated and sintered to form a shaped article 8. The shaped article 8 is cooled in the cooling zone C and extruded from the mold 1.

The whole surface of the inner wall of the mold 1 of the ram-extrusion apparatus is preferably coated with a coating layer of nickel, molybdenum disulfide or fluororesin. Provision of the coating layer will advantageously decrease frictional resistance and resistance by adhesion between the powdery mixture passing in the mold or compressed articles during sintering and the inner wall of the mold, thereby facilitating movement of the article towards the lower portion of the mold.

The inner surface of the mold is preferably coated with fluororesin or mixture consisting of fluororesin, additives or fillers (including metal powder). The inner surface of the mold may be provided with hard chrome plating or nickel plating, and then coated with fluororesin of ethylene tetrafluoride thereover.

In the method of the invention, the pressure in the mold of the ram-extrusion apparatus is determined by the frictional resistance between the inner wall of the mold and the article which is under formation by carrying out alternately filling and extruding the powdery mixture under the above mentioned conditions, and the frictional resistance between the back pressure regulator (i.e., back pressure-supplying means) 9 and the article 8 which comes out of the lower portion of the mold 1. The physical properties of shaped articles are apt to be highly influenced by the frictional resistance of the back pressure regulator 9 which generates pressure when the powdery mixture is shaped in the mold. The back pressure-supplying means such as the back pressure regulator 9 is preferably provided outside of the mold and maintained at a temperature of not higher than 300° C., more preferably at a temperature in the range of 250° to 300° C.

In the invention, in order to continuously produce long shaped articles under relatively low pressure by means of a relatively small sized ram-extrusion apparatus with high productivity, frictional resistance in the mold is required to be as small as possible. Further, in order to obtain long shaped articles having excellent physical properties, the back pressure caused by the frictional resistance of the back pressure regulator 9 should be adjusted within a specific range. In case that the back pressure is too low, the density or specific gravity of obtained article becomes low with poor physical properties. On the other hand, in case that the back pressure is too high, the stress remains in the resulting shaped articles, which causes deformation under stress when the articles are used at a high temperature.

The back pressure caused by frictional resistance of the back pressure regulator 9 differs depending on the composition of the powdery mixture employed, size or shape of the shaped article, size or shape of the mold and the frictional resistance of the shaped article in the mold. It is practically desirable that the back pressure is in the range of approx. 20 to 250 kg/cm$^2$, preferably 30 to 150 kg/cm$^2$ and more preferably 30 to 100 kg/cm$^2$.

The back pressure regulator 9 separately provided to the mold is preferably employed to obtain back pressure. In case of molding a tube-shaped article, the length of the stem can be adjusted through a phenomenon that the shaped tube holds a stem when it is cooled and hardened so that the frinctional resistance in the tube is adjusted.

The extrusion rate (i.e., molding rate) of the ram-extrusion apparatus is determined depending on the size of the shaped article and capacity of the heater of the mold. It is preferred to mold at approx. 500 to 2,000 mm/hr and preferably 600 to 1,500 mm/hr.

The use of the ram-extrusion apparatus in the type illustrated in FIG. 1 makes it possible to prepare a long shaped article of an aromatic polyimide which has a specific gravity of more than 1.380, a radial crushing strength of not less than 800 kg/cm$^2$, and a coefficient of linear expansion in the radial direction being not less than that in the longitudinal direction.

As described hereinbefore, the above-mentioned long extruded article having a high specific gravity, a high radial crushing strength, and a coefficient of linear expansion in the radial direction being less than that in the longitudinal direction is very advantageously used as a bearing after being fabricated in the form of a ring. This is because the ring-shaped bearing is preferred to have a high radial crushing strength as well as a low coefficient of linear expansion in the radial direction to avoid variation of the inner diameter.

The extruded long article of an aromatic polyimide more preferably has a radial crushing strength of not less than 900 kg/cm$^2$.

The extruded long article of an aromatic polyimide more preferably has a coefficient of linear expansion in the radial direction of not higher than $4.50 \times 10^{-5}$ m/m/° C. from room temperature (25° C.) to 300° C.

The present invention provides a method for easily and continuously producing long articles of an aromatic polyimide by a ram-extrusion process, employing a powdery mixture comprising an aromatic polyimide powder and a fluororesin powder. The obtained articles have excellent stability under heating (high temperature of heat distortion and stable coefficient of thermal expansion at a temperature from room temperature to 300° C.). Therefore, the shaped article of aromatic polyimide of the invention has heat resistance, mechanical properties and electric property satisfactory enough to employ as heat-resistant structural materials or electrical insulating materials.

The invention will be further described with reference to examples and comparison examples.

EXAMPLES 1 to 7

Long shaped articles having outer diameter of 15 mm were continuously produced from a powdery mixture comprising 100 weight parts of an aromatic polyimide powder (mean particle size: 12.0 μm or 22.5 μm, having the heat loss ratio shown in Table 1) prepared through polymerization and imidation of 3,3',4,4'-biphenyltetracarboxylic acid dianhydride and 4,4'-diaminodiphenyl ether and a polyethylene tetrafluoride powder (mean particle size: 7 μm) in the amount set forth in Table 1 by means of a ram-extrusion apparatus illustrated in FIG. 1 under conditions as set forth in Table 2.

Results of evaluation on the continuous-moldability in each example are set forth in Table 3. Evaluation was done according to the following criteria.

(1) the case wherein continuous molding was carried out without any trouble and unevenness in color was not found is marked with AA;

(2) the case wherein continuous molding was carried out without any trouble but unevenness in color was slightly observed was marked with BB;

(3) the case wherein it was difficult to mold continuously and unevenness in color was clearly observed was marked with CC; and (4) the case wherein continuous molding was impossible was marked with DD.

Each extruded long article was cut to make a test piece (tube-shaped piece, inner diameter: 9.5 mm, outer diameter: 13.5 mm, length: 10 mm). Specific gravity (substitution-in-water method, ASTM D792) and radial crushing strength (JIS Z 2507, unit: kg/cm$^2$) of each test piece was measured. The results are set forth in Table 3.

COMPARISON EXAMPLES 1 TO 7

Long extruded articles having outer diameter of 15 mm were continuously produced from a powdery mixture comprising 100 weight parts of an aromatic polyimide powder (mean particle size: 12.0 μm or 42.1 μm, having the heat loss ratio shown in Table 1) prepared in the same manner as in Example 1 and a polyethylene tetrafluoride powder (mean particle size: 7 μm) in Comparison Examples 1 to 5, or MoS$_2$ (mean particle size: 3.5 μm) in Comparison Example 6 in the amount shown in Table 1 by means of the ram-extrusion apparatus illustrated in FIG. 1 under conditions as shown in Table 2.

Continuous moldability of ram-extrusion molding in each comparison example was evaluated according to the same methods as those in Example 1. The results are set forth in Table 3.

Each extruded article was cut to obtain a test piece similar to that of Example 1. The specific gravity and radial crushing strength were measured. The results are set forth in Table 3.

TABLE 1

|  |  | Polyimide Powder | | Fluororesin Powder | |
|---|---|---|---|---|---|
|  |  | Mean Particle Size (μm) | Heat Loss Ratio (wt. %) | Resin | Amount (wt. part) |
| Example | 1 | 12.0 | 0.62 | PTFE | 1.0 |
|  | 2 | 12.0 | 1.78 | PTFE | 1.0 |
|  | 3 | 22.5 | 0.62 | PTFE | 1.0 |
|  | 4 | 12.0 | 0.62 | PTFE | 1.0 |
|  | 5 | 12.0 | 0.62 | PTFE | 1.0 |
|  | 6 | 12.0 | 0.62 | PTFE | 1.0 |
|  | 7 | 12.0 | 0.62 | PTFE | 6.0 |
| Comparison Example | 1 | 12.0 | 3.50 | PTFE | 1.0 |
|  | 2 | 12.0 | 2.23 | PTFE | 1.0 |
|  | 3 | 42.1 | 0.62 | PTFE | 1.0 |
|  | 4 | 12.0 | 0.62 | PTFE | 0.1 |
|  | 5 | 12.0 | 0.62 | PTFE | 10.0 |
|  | 6 | 12.0 | 0.62 | MoS$_2$ | 1.0 |
|  | 7 | 12.0 | 0.62 | None | 0.0 |

TABLE 2

| | Molding Conditions of Ram-Extrusion Process | | | | | |
|---|---|---|---|---|---|---|
| | Molding Temperature | | | Pressure | | Rate of Extrusion (mm/hr) |
| | First Heater (°C.) | Second Heater (°C.) | Third Heater (°C.) | Ram Extrusion (kg/cm²) | Back Pressure (kg/cm²) | |
| Example 1 | 365 | 355 | 320 | 500 | 80 | 790 |
| 2 | 362 | 352 | 321 | 540 | 80 | 750 |
| 3 | 365 | 355 | 320 | 480 | 80 | 800 |
| 4 | 365 | 355 | 320 | 700 | 100 | 750 |
| 5 | 365 | 355 | 320 | 400 | 30 | 825 |
| 6 | 365 | 355 | 320 | 900 | 80 | 785 |
| 7 | 365 | 355 | 320 | 400 | 80 | 820 |
| Comparison Example 1 | 365 | 355 | 320 | — | — | — |
| 2 | 365 | 355 | 320 | 650 | 80 | 830 |
| 3 | 365 | 355 | 320 | 450 | 80 | 820 |
| 4 | 365 | 355 | 320 | 1700 | 80 | 755 |
| 5 | 365 | 355 | 320 | 400 | 80 | 1000 |
| 6 | 365 | 355 | 320 | — | — | — |
| 7 | 365 | 355 | 320 | — | — | — |

Remarks: The coating layer provided to the inner surface of the mold was made of PTFE(polytetraethylene fluoride), except for Example 6 and Comparison Example 7, in both of which the coating layer was made of a nickel-plating layer.

TABLE 3

| | Continuous Moldability | Specific Gravity | Radial Crushing Strength (kg/cm²) |
|---|---|---|---|
| Example 1 | AA | 1.403 | 1100 |
| 2 | BB | 1.382 | 940 |
| 3 | AA | 1.381 | 920 |
| 4 | AA | 1.396 | 1050 |
| 5 | BB | 1.391 | 1000 |
| 6 | BB | 1.386 | 950 |
| 7 | AA | 1.400 | 920 |
| Comparison Example 1 | DD | — | — |
| 2 | CC | 1.290 | 495 |
| 3 | BB | 1.354 | 580 |
| 4 | CC | 1.375 | 900 |
| 5 | AA | 1.410 | 620 |
| 6 | DD | — | — |
| 7 | DD | — | — |

The extruded long articles obtained in these examples were cut to form a test piece respectively. Heat distortion temperature of these pieces were measured according to ASTM D-648 (load: 18.6 kg/cm²). As the result, it was confirmed that each piece had heat distortion temperature of not lower than 350° C. and had satisfactory heat resistance. Further, a coefficient of thermal (linear) expansion (from room temperature to 300° C.) in the longitudinal direction (along the axis of extrusion direction) and that in the radial direction (cross direction) of the extruded long article (i.e., rod) obtained in Example 1 were measured according to ASTM D-696 to obtain $6.3 \times 10^{-5}$ m/m/° C. and $3.98 \times 10^{-5}$ m/m/° C., respectively.

It was further confirmed that the shaped articles prepared in Examples 2–7 had similar coefficients of linear expansion as that of Example 1.

EXAMPLE 8

The shaped article of Example 1 was heated at 300° C. for 12 hours. Subsequently, the coefficient of linear expansion (from room temperature to 300° C.) in the longitudinal direction (along the axis of extrusion direction) and in the radial direction (cross direction) of thus heat-treated article were measured according to ASTM D-696.

The results are as follows:
Coefficient of Linear Expansion:
  Longitudinal Direction: $4.57 \times 10^{-5}$ m/m/° C.
  Radial (Cross) Direction: $4.20 \times 10^{-5}$ m/m/° C.

It was further confirmed that the extruded articles prepared in Examples 2–7 after the heat treatment showed similar coefficients of linear expansion to the above coefficients of the heated article of Example 1.

We claim:
1. A method of continuously forming a shaped long article of an aromatic polyimide powder which comprises repeating the steps of:
  supplying a powdered mixture containing 100 weight parts of a powder of an aromatic polyimide having been prepared by polymerization-imidation of a tetracarboxylic acid containing not less than 50 mol.% of a biphenyltetracarboxylic acid or its derivative and an aromatic diamine; and having a heat loss ratio of not more than 2 wt.%, the heat loss ratio being measured at 360° C. for 1 hour; and having a mean particle size in the range of 0.1 to 40 μm; and 0.2 to 8 weight parts of a fluororesin powder having a mean particle size not larger than 40 μm; to a ram-extrusion apparatus having a mold; and
  ram extruding the powdered mixture at a temperature of not lower than 300° C. and at a pressure in the range of 100–1,500 kg/cm², using a back pressure-supplying means which is provided outside of the mold, is maintained at a temperature of not higher than 300° C., and gives a back pressure in the range of 20 to 250 kg/cm², thereby producing a shaped article.

2. The method as claimed in claim 1, wherein the heat loss ratio of an aromatic polyimide powder is not more than 1 wt.%.

3. The method as claimed in claim 1, wherein the mean particle size of an aromatic polyimide powder is in the range of 1 to 30 μm.

4. The method as claimed in claim 1, wherein the mean particle size of an aromatic polyimide powder is in the range of 2 to 20 μm.

5. The method as claimed in claim 1, wherein the mean particle size of an aromatic polyimide powder is in the range of of 2 to 20 μm and not less than 80 wt.% of the aromatic polyimide powder has particle size in the range of 0.1 to 50 μm.

6. The method as claimed in claim 1, wherein the fluororesin powder is used in an amount of 0.3 to 6.5 weight parts per 100 weight parts of the aromatic polyimide powder.

7. The method as claimed in claim 1, wherein the step of alternately filling the mold with the mixture and ram-extruding the same is performed at a temperature in the range of 320° to 500° C.

8. The method as claimed in claim 1, wherein the step of ram-extruding the filled mixture is performed at a pressure in the range of 150–700 kg/cm².

9. The method as claimed in claim 1, wherein the step of ram-extruding the filled mixture is performed using a back pressure-supplying means which is provided outside of the mold and gives a back pressure in the range of 30 to 150 kg/cm².

* * * * *